United States Patent Office 2,937,201
Patented May 17, 1960

2,937,201
PROCESS FOR THE PRODUCTION OF AZELAIC ACID

Willi Ziegenbein, Walter Franke, and Achim Striebeck, Recklinghausen, Germany, assignors to Chemische Werke Hüls Aktiengesellschaft, Marl, Kreis Recklinghausen, Germany, a corporation of Germany No Drawing. Application February 9, 1959
Serial No. 791,811

Claims priority, application Germany September 2, 1958

1 Claim. (Cl. 260—537)

The known processes for the production of azelaic acid are based upon the treatment of natural products, from which the acid is obtainable in more or less good yields by saponification and oxidation of the hydrolysis products. Oleic acid and ricinoleic acid yield azelaic acid by ozonization and decomposition of the ozonides. Ricinoleic acid can also be oxidized to azelaic acid by nitric acid. In view of the fact that natural oils are the basis of all of these processes and are mixtures of higher fatty acid esters, it can be seen that it is difficult to obtain a pure azelaic acid product in this way.

It has been found that it is possible to produce pure azelaic acid in a complete synthesis by condensing 1-methoxy-butene-1-ine-(3) with 1-chloro-5-methoxy-pentene-(2) or 3-chloro-5-methoxy-pentene-(1), or with an isomeric mixture of 1-chloro-5-methoxy-pentene-(2) and 3-chloro-5-methoxy-pentene-(1) in an alcoholic solution of an alkali metal hydroxide in the presence of cuprous compounds to form 1,9-dimethoxy-nonadiene-1,6-ine-(3), hydrogenating this in the known manner and oxidizing with nitric acid. The procedural steps are summarized in the following equations:

(1) 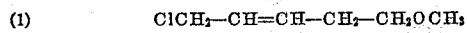
$$ClCH_2-CH=CH-CH_2-CH_2OCH_3$$

or

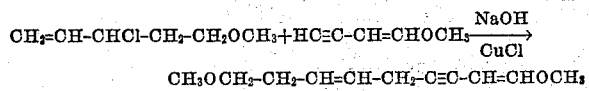
$$CH_2=CH-CHCl-CH_2-CH_2OCH_3+HC\equiv C-CH=CHOCH_3 \xrightarrow[CuCl]{NaOH}$$
$$CH_3OCH_2-CH_2-CH=CH-CH_2-C\equiv C-CH=CHOCH_3$$

(2) 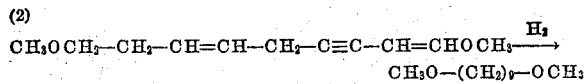
$$CH_3OCH_2-CH_2-CH=CH-CH_2-C\equiv C-CH=CHOCH_3 \xrightarrow{H_2}$$
$$CH_3O-(CH_2)_9-OCH_3$$

(3) 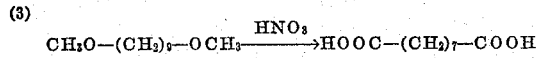
$$CH_3O-(CH_2)_9-OCH_3 \xrightarrow{HNO_3} HOOC-(CH_2)_7-COOH$$

As starting material one may use technical 1-methoxy-butene-1-ine-(3), which is produced technically from the diacetylene collected as byproduct in the acetylene production by the arc light process and 1-chloro-5-methoxy-pentene-(2) which is readily available from butadiene and chloromethylmethylether, or an isomeric mixture of approximately 50–75% of 1-chloro-5-methoxy-pentene-(2) and 50–25% of 3-chloro-methoxy-pentene-(1) obtainable in this manner.

The first step consists in the condensation of 1-methoxy-butene-1-ine-(3) with 1-chloro-5-methoxy-pentene-(2) or 3-chloro-5-methoxy-pentene-(1) or with an isomeric mixture of 1-chloro-5-methoxy-pentene-(2) and 3-chloro-5-methoxy-pentene-(1). The condensation takes place, splitting of hydrogen chloride, at 10 to 60° C. in alcoholic solution of molar quantities of potassium or sodium hydroxide in the presence of catalytic quantities of cuprous chloride, whereby one obtains 1,9-dimethoxy-nonadiene-1,6-ine-(3) in 65 to 70% yield.

It is not necessary to use pure 1-chloro-5-methoxy-pentene-(2) for the condensation, since 3-chloro-5-methoxy-pentene-(1) rearranges under the reaction conditions and likewise yields 1,9-dimethoxy-nonadiene-1,6-ine-(3). Besides methanol it is also possible to use ethanol, propanol and dioxan or tetrahydrofuran as the solvent. The addition of cuprous compounds, as for example cuprous chloride, amounts to about 0.5–5% by weight referred to the methoxy-butenine. After the separation of the alkali metal chloride formed the 1,9-dimethoxy-nonadiene-1,6-ine-(3) is recovered by distillation.

In the second stage of the process the 1,9-dimethoxy-nonadiene-1,6-ine-(3) product is hydrogenated. It is not necessary, as described above, to isolate the 1,9-dimethoxy-nonadiene-1,6-ine-(3) from the reaction mixture, but one can immediately use the solution filtered off from the separated alkali metal chloride from the first step. The addition of hydrogen is carried out in known manner either discontinuously or continuously. For example, the 1,9-dimethoxy-nonadiene-1,6-ine-(3) is treated with hydrogen in a pressure vessel, in the presence of a hydrogen carrier, like Raney nickel, under a pressure of 20 to 200 atmospheres and at a temperature between 50 and 150° C. The reaction yields 1,9-dimethoxy-nonane with a yield of more than 90%.

The last step is the oxidation of the 1,9-dimethoxy-nonane with nitric acid at 20 to 25° C., which yields azelaic acid with 87 to 90% yield, and can be carried out advantageously also in the presence of an oxygen carrier, such as vanadium pentoxide. For the isolation of the azelaic acid the reaction mixture after the oxidation step is diluted with water whereby the acid separates as an almost white crystal mash, which is suction filtered, washed with water and if necessary recrystallized from hot water.

By the combination of the three steps described above a very pure azelaic acid with a melting point of 106.5° C. can be made on a technical scale.

The azelaic acid can be used for the production of special polyamides, polyesters and softeners and is furthermore a valuable intermediate product for organic chemical syntheses.

EXAMPLE

Step 1

(a) In a solution of 280 parts by weight of potassium hydroxide or 200 parts by weight of sodium hydroxide in 1500 parts by weight of methanol are dissolved or dispersed 20 parts by weight of cuprous chloride (anhydrous) and 45 parts by weight of potassium carbonate. To this are added with stirring 450 parts by weight of technical 1-methoxy-butene-1-ine-(3). Into the resulting reaction mixture are dropped 675 parts by weight of 1-chloro-5-methoxy-pentene-(2) with good stirring, so that a reaction temperature of about 50° C. is attained. After the introduction of the 1-chloro-5-methoxy-pentene-(2) the stirring is continued another 1 to 2 hours, and subsequently the solution is filtered off from the potassium or sodium chloride and the reaction product is distilled under vacuum in a nitrogen atmosphere. At 105 to 108° C. under a pressure of 2 to 3 Torr (150 to 152° C. under 20 Torr) one obtains 560 parts by weight of 1,9-dimethoxy-nonadiene - 1,6 - ine - (3), ($d_4^{20}$:0.9572, $n_D^{20}$: 1.5030) in the form of a pale yellow oil.

(b) Under the same reaction conditions as described under (a) 675 parts by weight of a mixture of about 70% of 1-chloro-5-methoxy-pentene-(2) and 30% of 3-chloro-5-methoxy-pentene-(1) are reacted with 450 parts by weight of 1-methoxy-butene-1-ine-(3). By distillation between 105 to 108° C. under 2 to 3 Torr one obtains 581 parts by weight of 1,9-dimethoxy-nonadiene,1,6-ine-(3) in the form of a pale yellow oil.

(c) If instead of 1-chloro-5-methoxy-pentene-(2) there is used 3-chloro-5-methoxy-pentene-(1) in Example 1(a), and if one then proceeds as under 1(a), 1,9-dimethoxy-nonadiene- 1,6-ine-(3) is obtained in the same yield.

*Step 2*

500 parts by weight of 1,9-dimethoxy-nonadiene-1,6-ine-(3) are hydrogenated in an autoclave under 200 atmospheres of hydrogen pressure in the presence of 25 to 50 parts by weight of Raney nickel. The temperature is maintained for about 3 hours each at 70° C., 90° C., 110° C. and 140° C. After filtering off the catalyst sludge one distils under vacuum. Between 121 to 124° C. under 20 Torr there come over 470 parts by weight of 1,9-dimethoxy-nonane as a colorless liquid ($d_4^{20}$: 0.8553, $n_D^{20}$: 1.4269).

*Step 3*

Into 100 parts by weight of fuming nitric acid (D1.51) to which have been added 0.1 part by weight of vanadium pentoxide, are dropped gradually and with stirring 47 parts by weight of 1,9-dimethoxy-nonane. A reaction temperature of 25° C. should not be exceeded. After the introduction of all of the 1,9-dimethoxy-nonane the resulting mixture is allowed to stand for 2 to 3 hours at the same temperature. After stirring the reaction mixture into water the azelaic acid separates out as a crystal mass, which is washed well with water, separated and dried under vacuum. One thus obtains 41.5 parts by weight of the acid wihch is already quite pure (melting point 104 to 105° C.). After recrystallization from hot water and good drying 39.5 parts by weight of a very pure, white azelaic acid with a melting point of 106.5° C. are obtained.

We claim:

Process for the production of azelaic acid which comprises condensing 1-methoxy-butene-1-ine-(3) with a member selected from the group consisting of 1-chloro-5-methoxy-pentene-(2), 3-chloro-5-methoxy-pentene-(1) and mixtures thereof in an alcoholic solution of an alkali metal hydroxide in the presence of a cuprous compound thereby forming 1,9-dimethoxy-nonadiene-1,6-ine-(3), hydrogenating the latter thereby producing 1,9-dimethoxy-nonane and oxidizing the latter with nitric acid.

No references cited.